United States Patent
Allahut et al.

(10) Patent No.: US 12,117,879 B2
(45) Date of Patent: Oct. 15, 2024

(54) CONTROL SYSTEM AND ASSOCIATED METHOD FOR STARTUP, CONTROL AND MONITORING OF POWER SUPPLY COMPONENTS

(71) Applicant: Siemens Aktiengesellschaft, Munich (DE)

(72) Inventors: Gerd Allahut, Greding (DE); Robert Schedlberger, Bad Zell (AT); Erwin Wieland, Vienna (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 175 days.

(21) Appl. No.: 16/275,591

(22) Filed: Feb. 14, 2019

(65) Prior Publication Data
US 2019/0250686 A1    Aug. 15, 2019

(30) Foreign Application Priority Data
Feb. 15, 2018 (EP) .................................... 18156846

(51) Int. Cl.
*G06F 1/28* (2006.01)
*G05B 19/042* (2006.01)
(Continued)

(52) U.S. Cl.
CPC .......... *G06F 1/28* (2013.01); *G05B 19/0423* (2013.01); *G05B 19/0426* (2013.01); *G06F 1/26* (2013.01);
(Continued)

(58) Field of Classification Search
None
See application file for complete search history.

(56) References Cited

U.S. PATENT DOCUMENTS

| | | | |
|---|---|---|---|
| 8,138,715 B2 * | 3/2012 | Lowenthal | B60L 53/67 320/104 |
| 2008/0086649 A1 | 4/2008 | Hublitz et al. | |

(Continued)

FOREIGN PATENT DOCUMENTS

| | | |
|---|---|---|
| CN | 100481672 C | 4/2009 |
| CN | 102326132 | 1/2012 |

(Continued)

OTHER PUBLICATIONS

EP Search Report based on EP Application No. 18156846 dated Aug. 18, 2017.
(Continued)

*Primary Examiner* — Paul Yen
(74) *Attorney, Agent, or Firm* — Cozen O'Connor

(57) ABSTRACT

A method for startup, control and monitoring of power supply components of at least one system utilizes a control system for power supply components, such as electrical power supplies, electrical safety devices or metering units, of the at least one system, and by which an energy supply of control and/or computer units of the at least one system is monitored and controlled, wherein the control system includes a central server unit to which a database for storing specific data and/or parameters of respective power supply components is assigned, includes client units for communication and for transmitting the specific data and/or parameters from and to the power supply components and includes local server units for communication which are permanently assigned to the respective power supply components, where a separate client unit can be generated for each power supply component connected and identified via a communication network.

20 Claims, 4 Drawing Sheets

(51) Int. Cl.
*G06F 1/26* (2006.01)
*H02J 50/80* (2016.01)
*H04L 67/12* (2022.01)
*G05B 19/418* (2006.01)

(52) U.S. Cl.
CPC .............. *G06F 1/263* (2013.01); *H02J 50/80* (2016.02); *H04L 67/12* (2013.01); *G05B 19/4185* (2013.01)

(56) References Cited

U.S. PATENT DOCUMENTS

| | | | | |
|---|---|---|---|---|
| 2010/0218014 | A1* | 8/2010 | Bozek | G06F 9/5094 |
| | | | | 713/320 |
| 2013/0290729 | A1* | 10/2013 | Pettigrew | G06F 21/52 |
| | | | | 713/189 |
| 2016/0073443 | A1 | 3/2016 | Deiretsbacher et al. | |
| 2016/0314058 | A1* | 10/2016 | Haggenmüller | G06F 11/3495 |
| 2017/0123481 | A1* | 5/2017 | Benesch | G06F 1/12 |
| 2018/0088541 | A1 | 3/2018 | Sangi | |
| 2019/0018971 | A1* | 1/2019 | Shmaya | H04L 12/22 |
| 2019/0034297 | A1* | 1/2019 | Basur Shankarappa | |
| | | | | G06F 11/1469 |
| 2019/0098169 | A1* | 3/2019 | Matsumoto | H04N 1/00344 |

FOREIGN PATENT DOCUMENTS

| | | |
|---|---|---|
| CN | 105407129 | 3/2016 |
| CN | 106664019 | 5/2017 |
| CN | 107567604 | 1/2018 |
| DE | 102008019040 | 10/2008 |
| WO | WO2005/107035 | 11/2005 |
| WO | WO 2015/169355 | 11/2015 |
| WO | WO2015/197684 | 12/2015 |
| WO | WO2015/197689 | 12/2015 |

OTHER PUBLICATIONS

Office Action dated Oct. 29, 2021 issued in Chinese Patent Application No. 201910116929.3.

* cited by examiner

CONTROL SYSTEM AND ASSOCIATED METHOD FOR STARTUP, CONTROL AND MONITORING OF POWER SUPPLY COMPONENTS

BACKGROUND OF THE INVENTION

1. Field of the Invention

The present invention relates to a method for startup, control and monitoring of power components of at least one system using a control system for power supply components, such as e.g. electrical power supplies, electrical safety devices, metering units, etc. of at least one system, by which an energy supply of control and/or computer units of the at least one system is monitored and controlled.

2. Description of the Related Art

The term automation system, or system for short, generally refers to an entirely or partially automated industrial system for making products or for controlling processes. For making products or for controlling processes, industrial systems usually comprise control and/or computer units, such as what are known as industrial PCs and/or intelligent electronic, mostly microprocessor-based, devices (e.g., control devices, protective devices, pressure and temperature transducers, flowmeters, actuators or programmable logic controllers) that control, monitor and/or supervise system-internal and/or system-specific processes.

Power supply components are used in a system to supply power to the control and/or computer units. In this context, power supply components refer to all the components in a current path, for instance, electrical power supplies and/or switched mode power supplies, electrical safety devices, energy storage devices (e.g. rechargeable battery, capacitor or superconducting magnetic energy storage device) or metering units, which monitor, control and ensure the supply of power via this current path to the relevant control and/or computer unit and hence ensure that procedures in the system run with minimum disruption. For applications in industrial systems, the power supply components are therefore subject to particular requirements. Thus, for example, flexible and simple configuration and startup play an important role. Particularly for the design/configuration of new systems and also for modifications to existing industrial systems, a reliable supply of energy to the control and/or computer units must be ensured in order to enable the respective system to operate with minimal disturbance. An easily manageable and flexible control and monitoring system specifically for power supply components would therefore be desirable.

In the system and machinery sector, software-based engineering tools are nowadays used, for example, for configuring a system's automation components (e.g., control units, programmable controllers, computer units or field devices). Depending on the scope of performance, there are software-based applications which are installed or operated at a fixed location on a personal computer (PC) or on a plurality of PCs, e.g., for distributed working. Less extensive, i.e., specialized applications are usually installed only on a PC. More recently, versions of the software-based engineering tools are also being made available as applications for mobile terminals (e.g., handhelds, tablets or smartphones), where the scope of performance of the respective engineering tool has to be limited because of the insufficient memory and computing power of the mobile terminals. In addition, with the advent of "cloud computing" that describes a provision of IT infrastructure (e.g., memory, computing power, application software) as a service provided via the Internet, applications that are operated on in some cases distributed computer units (e.g. servers) and whose functionality is made available to a user online, i.e., via the Internet, are becoming increasingly important.

When developing software-based applications for automation components, it is usually necessary to precisely define the destination systems (e.g. fixed-location and/or distributed terminals, mobile terminals, cloud computing) and, in particular, the operating systems (e.g. Windows, Linux, OS X or Unix) that is to run the respective application. The disadvantage of this is that, for example, applications having an identical scope of performance cannot be operated on different platforms or made available for different destination systems. In other words, the respective application has to be adapted to the corresponding destination system and/or operating system and accordingly to the automation component to be administered. At least an appropriate adaptation of the respective application is also necessary, e.g., in the event of a change of platform or changes in the operating system.

Concepts such as field device tool (FDT) that enables field devices of different manufacturers to be parameterized using a single software-based application, or field device integration (FDI) that is described in the article "FDI Device Integration—Best of Both Worlds" atp edition June 2010, pages 16 to 19 and that enables field devices in an automation system to be integrated as platform-independently as possible are well-known from the field of automation technology. FDI technology is based on a client-server architecture in which the field devices are administered centrally via a central processor, i.e., a server. A configuration of each field device within a system's topology is stored on the server. For an actual configuration of the field devices, a configuration tool is provided that is designed to administer the configuration of the field devices, i.e., of the FDI clients. Changes are first written to the server and then transmitted to the respective field device, where an existing communication link between server and field device, i.e., FDI client, is necessary and the transmission of data may possibly place a relatively heavy load on the respective field device. Moreover, the FDI concept is mainly limited to field devices.

DE 10 2008 019 040 A1 discloses a method and system for simplified and improved management, in particular configuration, of automation systems, particularly control devices or more specifically programmable logic controllers (PLCs). For this purpose, a control module and interface modules are provided in the control device, where the interface modules enable data to be transmitted to an input/output device in order to create, process or execute a control function on the control device and transfer parameters to the control device and/or read out process data. The application described in the publication DE 10 2008 019 040 A1 is likewise based on a server-client architecture, where a server application runs on the control device and a client application runs as a web client on the input/output device. The disadvantage of the system described is therefore that the server application is executed directly on the control device, which means that the control device has a high level of data complexity and is subject to an additional load due to data communication and data processing. In addition, the selected server-client architecture imposes a limitation to a relationship between a server application on the control device and one or only a small number of client applications. Access from a plurality of client applications may result in overloading of the server application or more specifically of the control device, as the communication resources of automation components are mainly tailored to the functionality necessary in the respective system or according to the sphere of operation. In most cases, only reserve resources are available for additional communication with, for example, configuration applications.

In contrast to automation components (e.g. control devices, programmable logic controllers or field devices), there are very few known corresponding configuration, control and monitoring applications for power supply components such as electrical power supplies and/or switched-mode power supplies, electrical safety devices or metering units. The publications WO2015/197689A1 and WO2015/197684A1, for example, disclose a switched-mode power supply with a web interface for connection to a communication network and a method for remotely configuring a switched-mode power supply for use in industrial systems. The solution described in these publications is based on the power supply component, i.e., the switched-mode power supply, having a web server which is used to configure, change and/or control data (e.g., operating parameters or process data) on a configuration unit (e.g. PC, mobile terminal) via a web browser.

For industrial power supply components, efficiency usually plays a significant role. The selection of computing and communication units (e.g. processors, or input/output bandwidth) incorporated in the power supply components and the amount of memory capacity is therefore limited. Moreover, the selection of the electronic components that are used is subject to severe cost pressure. The data processing and data communication resources for power supply components are therefore usually geared to the core tasks. Only reserve resources are normally provided for additional communication tasks in power supply components (e.g., exchanging data with the web browser application or accessing the web server).

The basic disadvantage of the solutions described in the two publications WO2015/197689A1 and WO2015/197684A1 is therefore that a communication link to the power supply component must be opened for each web browser. This can result in a heavy communication load in the power supply component.

SUMMARY OF THE INVENTION

In view of the foregoing, it is therefore an object of the invention to provide a control system and an associated method by which power supply components in industrial systems can be configured, controlled and monitored platform-independently, flexibly and in a simple and cost-effective manner, and which minimize the data transmission and data processing load placed on the respective power supply components.

This and other objects and advantages are achieved in accordance with the invention by a control system for power supply components of at least one system, by which an energy supply of control and/or computer units of the at least one system is monitored and controlled and therefore safeguarded. The control system comprises a central server unit, client units and local server units. The central server unit is assigned a database for storing specific data and/or parameters of the respective power supply components, such as device information, configuration parameters version data. The client units are configured to communicate with the power supply components or more specifically with the local server units and to transmit the specific data and/or parameters to and from the power supply units. For this purpose, a separate client unit can be generated for each power supply component connected and identified via a communication network. The local server units are permanently assigned to the respective power supply components and configured to communicate with the respective client units.

The main aspect of the inventive solution proposed consists in that, with a corresponding communication and data processing architecture of the control system in accordance with the invention, the data communication and data processing load placed on the power supply components is minimized. In the central server unit or more specifically in the associated database, an image of the respective specific data and/or parameters of the power supply components used in at least one system is implemented, which image can be accessed in a largely unlimited manner for configuration, administration, control and monitoring purposes. Data transmission, i.e., communication with the respective power supply components that are connected to the control system and identified via a communication network is restricted via the respective client units generated for the respective power supply units to a small number of necessary accesses (particularly in order to keep the data and/or parameters consistent between local server units or more specifically power supply components and the database assigned to the central server). The central server unit with the associated database therefore acts as a "data hub" by which virtual instances of the respective power supply components are represented and the communication and data load on the individual power supply component is considerably reduced.

The combination of a central server unit, client units which can be generated for each identified power supply component and are responsible for communication with the respective power supply component or more specifically permanently assigned local server unit, and local server units which are permanently assigned to the power supply components, provides for a largely platform- and device-independent as well as flexible control system design. The control system can therefore run on different hardware architecture variations (e.g., fixed-location PC system, distributed computer system or cloud computing) without functional limitations.

The communication and data processing architecture of the control system in accordance with the invention also allows a freely scalable server-client relation, ideally an n-to-m relation. The use of the central server unit eliminates a 1-to-1 relation between generatable client units and power supply components or more specifically the server units permanently assigned thereto in each case. The central server unit is accessed for configuration, administration, control and monitoring purposes, e.g., via client applications whose number can be specified, e.g., by configuration, capacity, etc. of the central server unit, where the number is therefore independent of the number of power supply components identified and controlled and monitored via the control system in accordance with the invention.

In accordance with an advantageous further embodiment of the invention, at least one input/output unit can be connected. The specific data and/or parameters for the respective power supply components can be entered, output and/or changed via the at least one input/output unit. The at least one input/output unit is ideally connected via an application, in particular a web application. The input, output and/or change of the specific data and/or parameters for the respective power supply components can be performed via a web browser, where a standardized Internet or web browser can be advantageously used as the user interface for the at least one input/output unit. This means that a fixed-location PC, fixed-location PC systems and mobile terminals (e.g. tablets or handhelds) can be used, for example, for the input/output unit or for displaying a user interface without additional outlay or functional limitations. In addition, cloud computing can also be used, via which, for example, the input/output unit or more specifically the display of the user interface as well as access to the functionalities of the control system according to the invention, particularly to the central server unit, are provided via an application.

It is advantageous if input, output and/or changing of specific data and/or parameters for the power supply components can be performed online and offline via the input/output unit. For inputs/outputs and/or changing of data and/or parameters performed online via an input/output unit, a communication link exists between the respective power supply component, or more specifically the local server unit permanently assigned to the respective power supply component, and the respective client unit. Offline means that for the respective inputs/outputs and/or changes of data or parameters there is no communication link between client unit and respective power supply component, or more specifically the assigned local server unit, or no client unit has yet been generated for the corresponding power supply component. For offline operation, only the central server unit, or more specifically the data/parameters from the assigned database, is accessed via the input/output unit. In offline mode, e.g., without power supply components of a system being subject to a data and communication load, or in a system planning phase in which, e.g., the power supply component types are selected but the power supply components themselves are not yet physically present, configurations for power supply components of a system are planned, prepared, verified, checked for errors, reliability and inconsistencies and possibly simulated, for example.

It is advantageous if "templates" are provided for generating the respective client units. These templates constitute a kind of "framework" for the respective client units, where some of the respective data structure and functional design is already specified. Missing parts such as current data, parameters and structures specific to the particular power supply component identified are added when the client unit is generated. As a result, the respective client unit can be rapidly generated dynamically when a power supply component is identified and the load placed on the respective power supply component by data communication, etc. can be minimized.

In accordance with an advantageous embodiment of the control system in accordance with the invention, a gateway unit (i.e. a networking unit) is provided to which a local server unit is assigned. Power supply components can be connected via the gateway unit via a serial interface for point-to-point connections, such as a USB interface or binary interface. For communication with the local server unit permanently assigned to the gateway unit, a client unit can be generated which thus uses the gateway unit to communicate with the power supply component connected via the gateway unit. The control system in accordance with the disclosed embodiments of the invention thus provides an inexpensive way of also controlling and monitoring power supply components which, for example, have no suitable interface (e.g., RJ45 interface) for direct connection to the communication network used (e.g., Ethernet), but only a serial interface for point-to-point connections. A USB interface, for example, can be used as a serial interface for point-to-point connections for high-speed data transfer between the power supply component and the gateway unit. For transmission of quasi-static (i.e., slowly changing digital) and non-time-critical signals, the power supply component can be connected, e.g., via a binary interface, i.e. I/O interface. The transmission of such signals such as simple measured values or signal states, can take e.g. several seconds.

In an advantageous further embodiment of the control system in accordance with the invention, the central server unit and/or the database assigned to the central server unit and/or the client units are provided via cloud computing. Cloud computing provides IT infrastructure such as storage, processing power or applications, as an Internet service. The advantage of this is that, for example, the functionalities of the control system in accordance with the disclosed embodiments of the invention can be inexpensively offered, e.g., to system operators via the Internet as a service or can be used e.g. by a system operator for, e.g., a plurality of systems irrespective of location via a "private cloud environment".

Ideally, communication between client units and the local server units permanently assigned to the power supply components is via an Open Platform Communications Unified Architecture (OPC-UA) interface. OPC Unified Architecture or OPC-UA for short is an industrially used machine-to-machine communication standard or more specifically an industrial machine-to-machine communication protocol that has the capability not only to transport machine- or device-specific data and/or parameters (e.g., controlled variables, measured values or parameter values) but also to write them in a machine-readable manner. Using an OPC-UA interface for communication offers the advantages of an open, manufacturer- and device-independent standard with which different power supply components can be connected. In addition, with authentication and authorization, encryption and data integrity via signatures, OPC-UA offers corresponding security and protection from tampering during data transfer between the client units and the local server units or more specifically power supply components.

It is also advantageous if authentication is provided for access to the specific data and/or parameters or more specifically for interrogating the specific data and/or parameters of the power supply components, where a level of displayed data and/or permissible change and configuration options can be defined by different user roles. Therefore, access via the input/output unit, i.e., access to the central server unit and the associated database is protected from unauthorized access and tampering. In addition, different views on the input/output unit or more specifically, via applications running in parallel, of the data and/or parameters i.e. configurations of the power supply components, can be provided by defining different user roles.

It is also an object of the invention to provide an associated method for startup, control and monitoring of power supply components of at least one system. An energy supply of control and/or computer units of the at least one system is monitored and controlled by the power supply components. The method in accordance with the invention is performed by the control system in accordance with the disclosed embodiments of the invention or more specifically runs thereon and comprises at least the following steps of addressing power supply components which are connected to the control system in accordance with the disclosed embodiments of the invention via a communication network via an identification call, returning response message containing unique identification data of the respective power supply component by local server units which are permanently assigned to the respective power supply components, generating a client unit is generated for each identified power supply component, where communication with the local server unit assigned to the respective power supply components is conducted by the respective client unit, and transmitting the unique identification data of the respective power supply component by the respective client unit to a central server unit and storing the unique identification data as specific data and/or parameters of the respective power supply component in the database assigned to the central server.

The main aspect of the method in accordance with the invention likewise consists, on the one hand, in that, via the process sequence, the data communication and data processing load placed on the supply components is kept relatively low. On the other hand, a method is provided whereby a connection to the central server unit and the associated database is established using the client units generated for the respectively identified power supply components. In the central server unit or more specifically in the assigned database, an image of the respective specific data and/or parameters of the power supply components used in the at least one system is implemented that can be accessed largely unrestrictedly for configuration, administration, control and monitoring purposes, e.g., via output applications. In other words, the method in accordance with the invention provides a freely scalable server-client relation, ideally an n-to-m relation, in which a plurality of and possibly different views of the same power supply components is possible in parallel. The central server unit with the associated database acts as a kind of "data hub" by which virtual instances of the respective power supply components are displayed and the communication and data load on the individual power supply component is considerably reduced.

It is advantageous if a template is used to generate the client unit for a respectively identified power supply component. In order to be able to generate the respective client units for the identified power supply components simply and rapidly in a dynamic manner, special templates can be used as a kind of "framework", e.g., for different frequently used types of power supply components (e.g., uninterruptible power supplies). Some of the respective data structure and functional design is already specified. Missing parts, such as current data, parameters and structures and those specific to the respectively identified power supply component, are added when the client unit is generated and the load placed on the power supply component by data communication, is minimized.

It is also advantageous, in the case of an existing communication link between the respective client unit and the local server unit assigned to the respective power supply component, and after appropriate authentication, if specific data and/or parameters of the respective power supply component are output on an input/output unit. If the user role is appropriate, then the specific data and/or parameters of the respective power supply component can be changed. The changed specific data and/or parameters are then forwarded via the central server unit and the respective client unit to the local server unit assigned to the respective power supply component in order to be processed and/or locally stored there by the local server unit assigned to the respective power supply component. The changed data and/or parameters are additionally stored in the database assigned to the central server unit (usually after successful forwarding and processing by the respective local server unit).

In the case of an existing communication link between the respective client unit and the local server unit assigned to the respective power supply component, in an expedient embodiment of the method in accordance with the invention local changes of specific data and/or parameters of the respective power supply component (i.e. changes which are made), for example, directly on the power supply component, e.g., manually or via a locally connected display unit) are transmitted to the associated client unit by the local server unit assigned to the respective power supply component. After forwarding by the respective client unit, the specific data and/or parameters transmitted are then stored in the database assigned to the central server unit. This provides a simple way to ensure that the data held in the database that is assigned to the central server unit has no inconsistencies or differences compared to the data and/or parameters stored locally in the power supply components.

Ideally in the event of local changes of specific data and/or parameters of a power supply component, a notification is sent to the respective client unit by the local server unit assigned to the respective power supply component. This informs the client unit and, via the client unit, the central server unit that local changes have been made for a power supply component. For example, transmission of the changes to the client unit or more specifically to the central server unit can be appropriately planned in order to minimize the communication and data transfer load for the respective power supply component.

In the case of an existing communication link between the respective client unit and the local server unit assigned to the respective power supply component, it is advantageous if the power supply component is indicated as "online". This provides a simple way of showing which power supply components have an active communication link to the respective client unit and therefore to the central server unit.

If the existing communication link between the respective client unit and the local server unit assigned to the power supply component is broken, it is advantageous if an alarm is issued. This provides a simple way of indicating a broken communication link.

In another expedient embodiment of the method in accordance with the invention, in the absence of an existing communication link between local server units assigned to the respective power supply components and the associated client units, changes of the specific data and/or parameters of the power supply components that are performed via the input/output unit are stored in the database assigned to the central server unit. The changes of the data and/or parameters are only transmitted to the respective local server units assigned to the respective power supply components, if there is an existing communication link between local server units assigned to the respective power supply components and the respective client units. Thus, for example, configurations of power supply units for new systems and/or rebuilding of systems or, e.g., version changes of the "firmware" of power supply components, can be prepared in offline mode. If there is an existing communication link, these changes are then transmitted to the respective local server units assigned to the respective power supply components. A load placed on the respective power supply component by the transmission can therefore be very easily taken into consideration.

In a further expedient embodiment of the method in accordance with the invention, for the existing communication link between the local server units assigned to the respective power supply components and the associated client units, an OPC-UA interface is used for data exchange. Using an OPC-UA interface for communication between client units and the local server units assigned to the respective power supply components provides communication in accordance with an open, manufacturer- and device-independent standard. In addition, OPC-UA offers corresponding security for data transfer and a degree of protection from tampering through authentication and authorization, encryption and data integrity via signatures e.g., via the specific firmware of the respective power supply component.

For transmitting the identification call, the Discovery and Configuration Protocol (DCP) is ideally used. The DCP is a protocol definition within the context of PROFINET, which is an open industrially used Ethernet standard that is used for automation. With DCP, power supply components of at least one automation system that are connected via a communication network (e.g., Ethernet) can be simply detected or identified via a "multicast" transmitted by the control system in accordance with disclosed embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below with reference to the accompanying figures by way of example, in which.

DETAILED DESCRIPTION OF THE EXEMPLARY EMBODIMENTS

Figure 1:
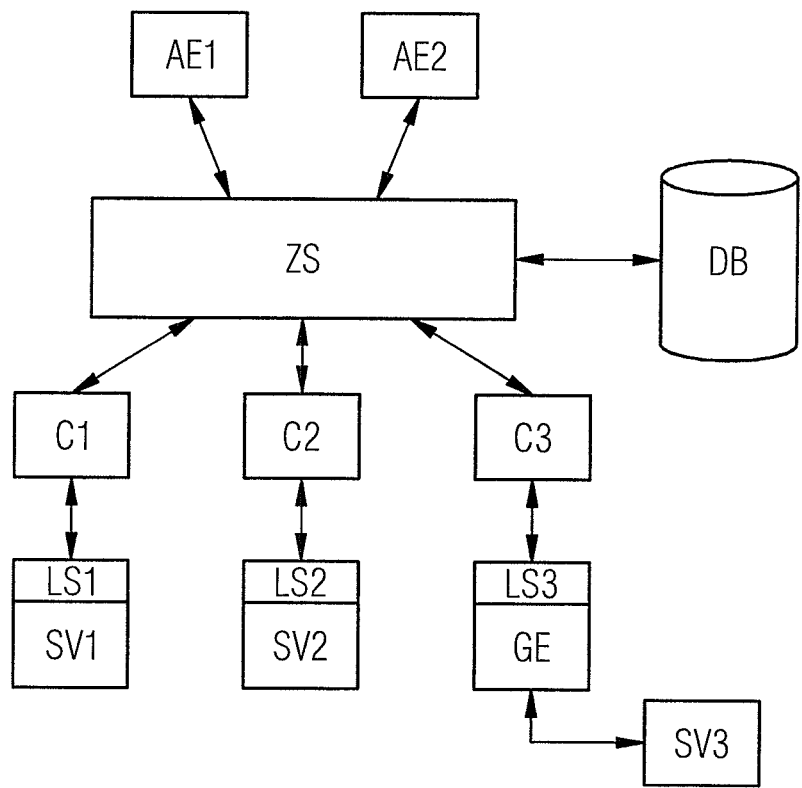
FIG. 1 schematically illustrates an exemplary structural design of the control system in accordance with the invention for power supply components.

FIG. 1 shows schematically and by way of example a structural and functional configuration of the control system in accordance with the invention for exemplary power supply components SV1, SV2, SV3 of at least one system. An energy supply of control and/or computer units of the at least one system are monitored and controlled by the power supply components SV1, SV2, SV3 (e.g., electrical power supplies, switched-mode power supplies or electrical safety devices, metering units etc.). In FIG. 1, three exemplary power supply components SV1, SV2, SV3 are shown. Here, for example, a first and a second power supply component SV1, SV2 have an interface (e.g. RJ45 interface) for direct connection to a communication network used, in particular Ethernet. A third power supply component SV3 has, e.g., only a serial interface for a point-to-point connection such as a USB interface or a binary interface for transmitting quasi-static signals (e.g., non-time-critical or low-time-critical interrogations of signal states, or measured values).

The inventive control system illustrated by way of example in FIG. 1 comprises a central server unit ZS to which a database DB is assigned. Specific data and/or parameters of the respective power supply components SV1, SV2, SV3 (e.g., device information, device type, address data, configuration parameters or version data of the device firmware) can be stored in the database DB. The central server unit ZS and the associated database can be implemented, for example, on a processing unit (e.g., PC or laptop) or a distributed computer system. However, the central server unit ZS and/or the database DB can also be provided via "cloud computing", e.g., via the Internet or a corporate network.

In addition, client units C1, C2, C3 are provided that are configured to communicate with the central server unit ZS, or more specifically to transmit the specific data and/or parameters from and to the central server unit ZS and from and to the respective power supply components SV1, SV2, SV3. A separate client unit C1, C2, C3 can be generated for each power supply component SV1, SV2, SV3 connected and identified via the communication network used (e.g., Ethernet). Thus, for example, a first client unit C1 is generated for the first power supply unit SV1, a second client unit C2 for the second power supply unit SV2, and a third client unit C3 for the third power supply unit SV3. For generating the client units C1, C2, C3, "templates" are provided in which at least some of the respective data structure and functional configuration of the respective client unit C1, C2, C3 is already specified. The client units C1, C2, C3 can, for example, run on the same processor unit, or on another processor unit such as the central server unit ZS. In addition, the client units C1, C2, C3 can also be provided via "cloud computing".

The control system in accordance with the invention also comprises local server units LS1, LS2, LS3 that are permanently assigned to the respective power supply components SV1, SV2, SV3. Thus, for example, the first and second power supply components SV1, SV2, which have an interface for direct connection to the communication network used (e.g., Ethernet), have local server units LS1, LS2 that are actively mounted e.g., directly in/on the power supply component. A first local server unit LS1 of the first power supply component SV1 communicates with the first client unit C1 via the communication network used. A second local server unit LS2 of the second power supply component SV2 communicates with the client unit C2 via the communication network. An "OPC-UA" interface, for example, can be used for communication or more specifically data transfer between the respective local server units LS1, LS2 and the respective client units.

For connection of the third power supply component SV3 which, for example, only has a serial interface for a point-to-point connection (e.g., USB interface or binary interface) for connection to the communication network, a gateway unit GE is provided. The gateway unit GE is assigned a third local server unit LS3 which communicates with the third client unit C3. The third client unit C3 therefore communicates with the third power supply component SV3 via the gateway unit GE. For communication or more specifically data transfer between the third client unit C3 and the third local server unit LS3 which is assigned to the gateway unit GE, an OPC-UA interface can again be provided, for example.

In addition, at least one input/output unit AE1, AE2 can be connected, e.g., via a communication network (e.g., Internet, Ethernet or wireless/radio communication network). In the exemplary embodiment of the control system in accordance with the invention as schematically illustrated by way of example in FIG. 1, e.g., two input/output units AE1, AE2 are provided. Via the input/output units, specific data and/or parameters for the respective power supply components SV1, SV2, SV3 can be entered, output and/or changed and also called up for monitoring purposes.

The input/output units AE1, AE2 are connected via an application, in particular a web application, by which a communication link can be established, e.g., via the Internet to the central server unit ZS and by which a client application to the central server unit ZS is created. A standardized Internet or web browser can be used for inputting, outputting, i.e., displaying and/or changing, specific data and/or parameters of the respective power supply component SV1, SV2, SV3 by or more specifically on one of the input/output units AE1, AE2, such as a fixed desktop PC, a mobile terminal (e.g., tablet, handheld or smartphone). The particular view displayed can be dynamically generated based on the specific data and/or parameters stored in the database DB assigned to the central server unit ZS for the respective power supply components SV1, SV2, SV3. OPC-UA methods and Hypertext Transfer Protocol Secure (https) can be used for handling the dynamic data exchange between the central server unit ZS and the web browser on the respective input/output unit AE1, AE2.

For access to or more specifically interrogation and/or changing of the specific data and/or parameters of the power supply components SV1, SV2, SV3 via the input/output units AE1, AE2, authentication, e.g., via a valid user name and password is additionally provided. In addition, an extent of the displayed data and/or parameters as well as permissible change and configuration options for power supply components SV1, SV2, SV3 can be specified by defining different user roles. User-specific data (e.g., user name or password) and defined user roles can be stored, e.g., ideally in encrypted form in a local user directory in the database DB assigned to the central server unit ZS.

Specific data and/or parameters of the respective power supply components SV1, SV2, SV3 can be input, output, i.e., displayed and/or changed, via the respective input/output units AE1, AE2 in online or offline mode. In online mode, there is an active communication link between the respective client unit C1, C2, C3 and therefore the central server unit ZS and the local server units LS1, LS2, LS3 that are assigned to the power supply components SV1, SV2, SV3. In online mode, e.g., data/parameters can therefore be interrogated directly by a power supply component SV1, SV2, SV3 and displayed on the input/output unit AE1, AE2, or data and/or parameter changes can be transmitted directly to the power supply component SV1, SV2, SV3 via central server unit ZS, client unit C1, C2, C3 and local server unit LS1, LS2, LS3. In offline mode, there is no communication link to the respective power supply components SV1, SV2, SV3 or more precisely to the respective associated local server units LS1, LS2, LS3. This means that data and/or parameters for outputting, inputting or changing specific data and/or parameters of the power supply components SV1, SV2, SV3 are transferred to the input/output unit AE1, AE2 by the central server unit ZS on the basis of stored data and/or parameters in the assigned database DB.

Figure 2:
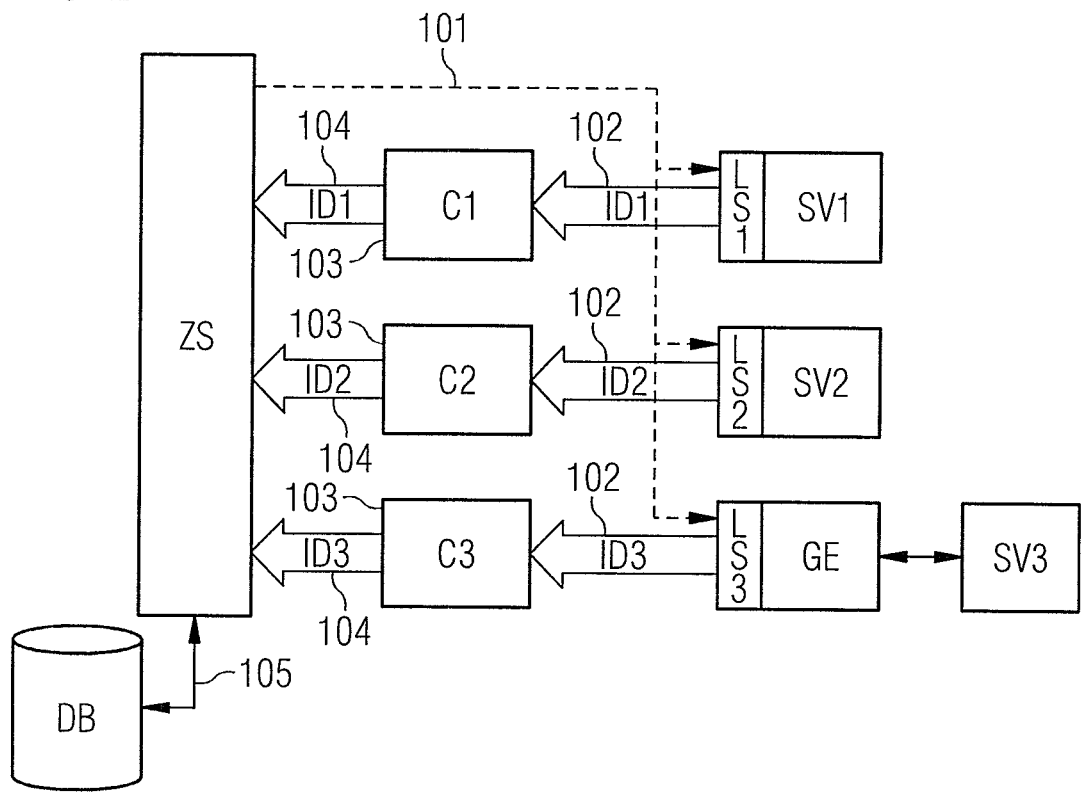
FIG. 2 shows an exemplary sequence of the inventive method for startup, control and monitoring of power supply components of at least one system.

FIG. 2 again illustrates the control system in accordance with the invention in schematic and exemplary form, where three exemplary power supply components SV1, SV2, SV3 are again monitored and controlled by the control system. The first and the second power supply components SV1, SV2 can, for example, be connected directly to the communication network, whereas the connection of the third power supply component SV3 is via the gateway unit GE. In order to be able to detect all the power supply components SV1, SV2, SV3 connected to the communication network (e.g. Ethernet) directly or via a gateway unit GE, in a starting procedure 101 an identification call is sent out by the control system or more specifically by the central server unit ZS. The power supply components SV1, SV2, SV3 connected to the communication network are addressed by the control system via the identification call. For transmission of the identification call (in the form of a "multicast", for example), e.g., the Discovery and Configuration Protocol (DCP) is used.

In an identification procedure 102, response messages with unique identification data ID1, ID2, ID3 of the respective power supply components SV1, SV2, SV3 are transmitted back by the respective local server units LS1, LS2, LS3 permanently assigned to the respective power supply components SV1, SV2, SV3. For power supply components, such as the exemplary third power supply component SV3 that is connected to the communication network via a gateway unit GE, the response message with the unique identification data ID3 of the third power supply component SV3 is created by the gateway unit GE based on the data of the third power supply component SV3 and transmitted. The unique identification data ID1, ID2, ID3 can include, for example, a unique identifier for the respective power supply component SV1, SV2 or, in the case of indirectly connected power supply components SV3, for the gateway unit GE (e.g. MAC address), a device name and/or ID or an IP address.

After the identification procedure 102, in a subsequent generating procedure 103 a client unit C1, C2, C3 is generated for each identified power supply component SV1, SV2, SV3. Communication with the respective local server unit LS1, LS2, LS3 of the respective power supply component SV1, SV2 is assumed by the respective client unit C1, C2, C3 or by the gateway unit GE for communication with the third power supply component SV3. In the generating procedure 103, e.g., "templates" are used for creating the client units C1, C2, C3. These templates already have, e.g., a basic structure for the client unit C1, C2, C3 which is used for communication with the respective power supply component SV1, SV2, SV3.

After generation of the client units C1, C2, C3, a communication link exists to the local server units LS1, LS2, LS3 which are assigned to the power supply components SV1, SV2, SV3, and the client units C1, C2, C3. The respective power supply components SV1, SV2, SV3 are therefore termed "online" and can be indicated accordingly (e.g., via an illuminated or flashing LED). Thereafter, e.g., in the event of a break in the existing communication link between a client unit C1, C2, C3 and a local server unit LS1, LS2, LS3 assigned to the power supply components SV1, SV2, SV3, an alarm is sent out. For the existing communication link between client units C1, C2, C3 and the local server units SV1, SV2, SV3, e.g., an OPC-UA interface is used for the exchange of data and/or parameters.

Figure 3:
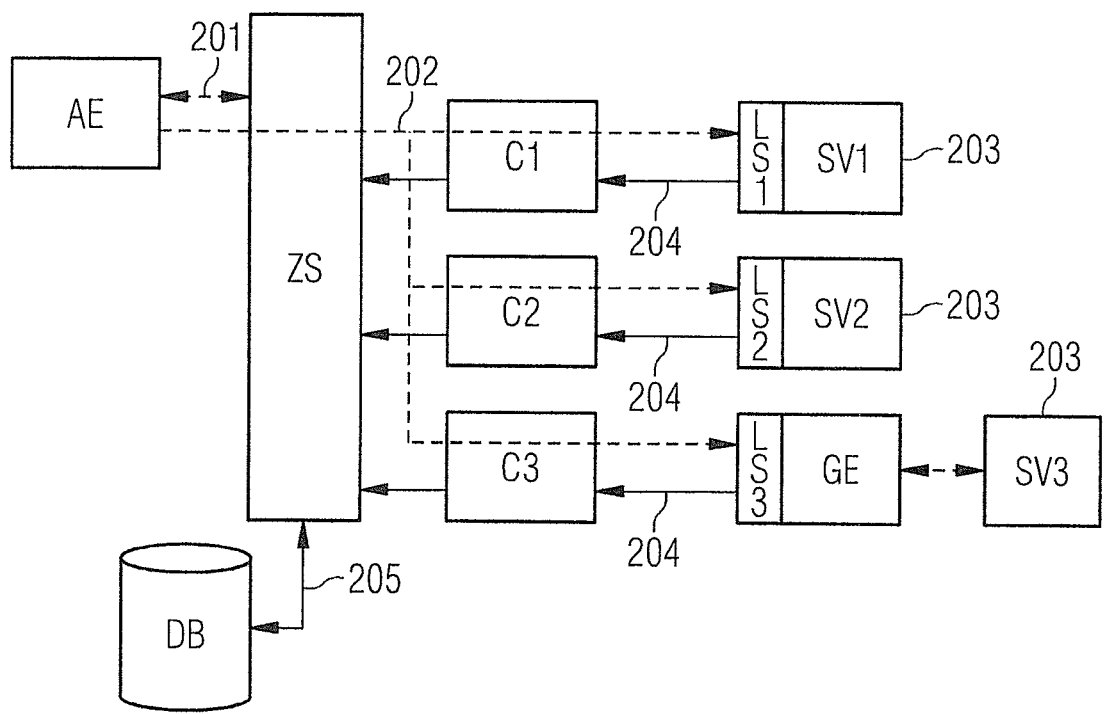
FIG. 3 shows an exemplary embodiment of the inventive method in cases of an existing communication link to the power supply components.

In a transmission procedure 104, the unique identification data ID1, ID2, ID3 of the respective power supply components SV1, SV2, SV3 is transmitted to the central server unit ZS by the client units C1, C2, C3. In a storage procedure 105, this data ID1, ID2, ID3 is then stored in the database DB that is assigned to the central server unit ZS. The power supply components SV1, SV2, SV3 connected directly and indirectly (i.e. via gateway unit GE) via the communication network (e.g. Ethernet, radio network, etc.) are now known to the control system and can be controlled and monitored as shown in an exemplary manner in FIGS. 3 and 4.

FIG. 3 again shows schematically and by way of example the control system in accordance with the invention which now has existing communication links to the three exemplary power supply components SV1, SV2, SV3. That is, communication links exist (e.g., via an OPC-UA interface) between the first and second client unit C1, C2 and the first and second local server unit LS1, LS2 of the first and second power supply component SV1, SV2 and/or between the third client unit C3 and the third local server unit LS3 of the gateway unit GE for connecting the third power supply component SV3. The power supply components SV1, SV2, SV3 are therefore termed "online".

Access to the central server unit ZS for a display and/or change procedure 201 is provided via an input/output unit AE. For this purpose, a client application (e.g., external OPC-UA client or web application) on a fixed or mobile terminal is used, for example. For the display and/or change procedure 201, an appropriate authentication, e.g., via user name and password is performed for connection to the central server unit ZS and display and/or changing of the specific data and/or parameters of the power supply components SV1, SV2, SV3 indicated as "online". The power supply components SV1, SV2, SV3 indicated as "online" are then displayed on the input/output unit AE. Power supply components SV1, SV2, SV3 can be selected according to a user role of the respective user to allow the associated specific data and/or parameters to be displayed and/or changed on the input/output unit AE, where the data and/or parameters displayed are supplied by the central server unit ZS and the assigned database DB.

For data and/or parameter changes via the input/output unit AE, in a write procedure 202, the changed specific data and/or parameters are first forwarded to the central server unit ZS and then to the respective client units C1, C2, C3. The changed data and/or parameters of the respective power supply component SV1, SV2, SV3 are then transmitted by the respective client units C1, C2, C3 to the respective local server units LS1, LS2, LS3. That is, for example, changed data/parameters for the first and second power supply component SV1, SV2 are transmitted by the first and second client unit C1, C2, respectively. Changed data/parameters for the third power supply component SV3 are transmitted by the third client unit C3 to the local server unit LS3 of the gateway unit GE which is responsible for forwarding the changed data/parameters to the third power supply component SV3 over the point-to-point connection (e.g., USB interface or binary interface).

In a processing procedure 203, the changed data/parameters are stored by the respective power supply components SV1, SV2, SV3. After successfully forwarding and storing the changed data/parameters on the respective power supply components SV1, SV2, SV3, in a checkback procedure 204 an appropriate message is transmitted to the respective client unit C1, C2, C3 by the respective local server unit LS1, LS2, LS3. Only upon receipt of the appropriate message are the changed data/parameters stored by the respective client unit C1, C2, C3 in the database DB assigned to the central server unit ZS in a storage procedure 205. The data and/or parameters of the power supply components SV1, SV2, SV3 are therefore held in the database DB in a form consistent with the data and/or parameters that are stored locally on the power supply units SV1, SV2, SV3. Inconsistencies in the data held in the database DB due to errors in the write procedure 202 and/or in the processing procedure 203 are therefore prevented.

Figure 4:
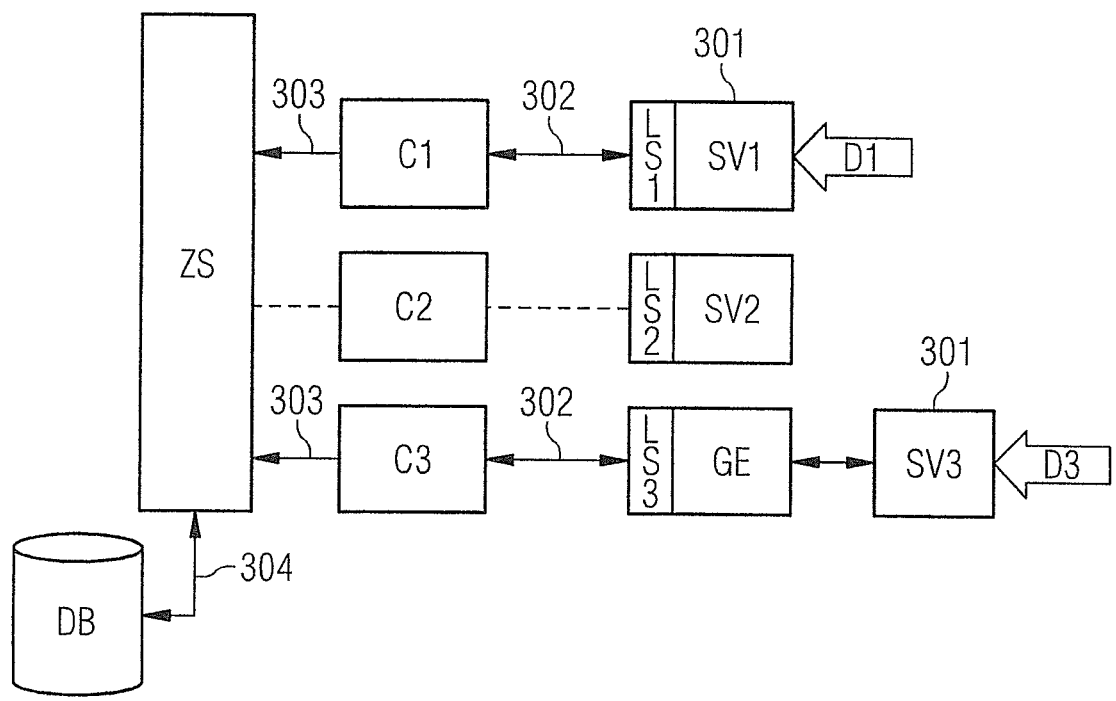
FIG. 4 shows another exemplary embodiment of the inventive method in the case of an existing communication link to the power supply components.

FIG. 4 likewise shows schematically and by way of example the inventive control system that has existing communication links to the three exemplary power supply components SV1, SV2, SV3. However, in the case of the embodiment illustrated by way of example in FIG. 4, in a change procedure 301 local changes D1, D3 of the specific data and/or parameters are performed (e.g., manually or via an input/output unit locally connected to the power supply component SV1, SV3) for the first and third power supply component SV1, SV3. In a notification procedure 302, the locally changed data and/or parameters D1 are therefore transmitted to the first client unit, e.g., by the first power supply component SV1 via the first local server unit LS1. The third power supply component SV3 is connected to the communication network via the gateway unit GE, for example. Therefore, e.g., local changes D3 of data/parameters are forwarded to the respective client unit C3 during the notification procedure 302 via the gateway unit GE or more specifically via the local server unit LS3 of the gateway unit. At the start of the notification procedure 302, a notification can be sent to the respective client unit C1, C3 by the respective local server unit LS1, LS3, e.g., as information about a local change D1, D3 of specific data and/or parameters.

In a forwarding procedure 303, a transmission is made to the central server unit ZS by the respective client unit C1, C3 and, in a storage procedure 304, storage occurs within the database DB assigned to the central server unit ZS.

Figure 5:
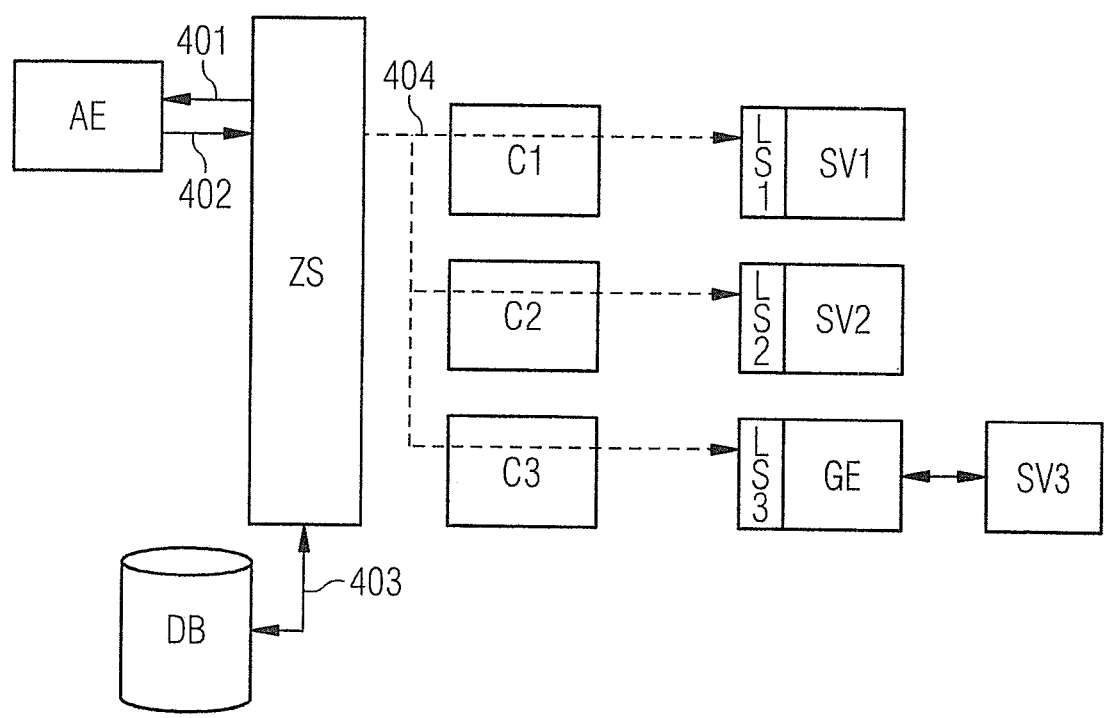
FIG. 5 shows an exemplary embodiment of the inventive method in the absence of an existing communication link to the power supply components.

In FIG. 5, which likewise shows schematically and by way of example the control system in accordance with the invention, an embodiment without an existing communication link to the power supply components SV1, SV2, SV3 is shown by way of example. In other words, the control system is operated offline. Offline operation can be present, for example, during a planning phase or a rebuilding phase of a system during which, e.g., there are as yet no communication links to all or individual power supply components SV1, SV2, SV3. For offline operation, for example, templates or structures of different power supply components SV1, SV2, SV3 can be loaded in advance into the central server unit ZS or more specifically into the assigned database DB. For example, data types or structures, of the power supply components SV1, SV2, SV3 or more specifically of the permanently assigned local server units LS1, LS2, LS3 are described by these templates or structures. The power supply components SV1, SV2, SV3 are therefore made available offline based on the templates or structures on the central server unit.

In a display and/or change procedure 401, the power supply components SV1, SV2, SV3 available offline can then be displayed and changed on an input/output unit AE, e.g., for "offline engineering". In a write procedure 402, the entered changes of the power supply components SV1, SV2, SV3 are then transmitted to the central server unit ZS and, in a storage procedure 403, stored in the database DB assigned to the central server unit ZS. During offline mode, for example, configurations of power supply components SV1, SV2, SV3 for new systems and/or rebuilding of systems or, e.g., version changes of the "firmware" of power supply components, etc. can be prepared and checked for errors.

If a communication link is established between the respective client units C1, C2, C3 and the local server units LS1, LS2, LS3 that are permanently assigned to the power supply components SV1, SV2, SV3, i.e., if the power supply components SV1, SV2, SV3 are "online", a transmission procedure 404 can be used to transmit the stored changes to the respective local server units LS1, LS2, LS3. The changes can then be stored on the power supply components SV1, SV2, SV3 and are therefore available there. With the embodiment shown in FIG. 5, ideally e.g., a plurality of power supply components SV1, SV2, SV3 of a system can be configured relatively rapidly.

Figure 6:
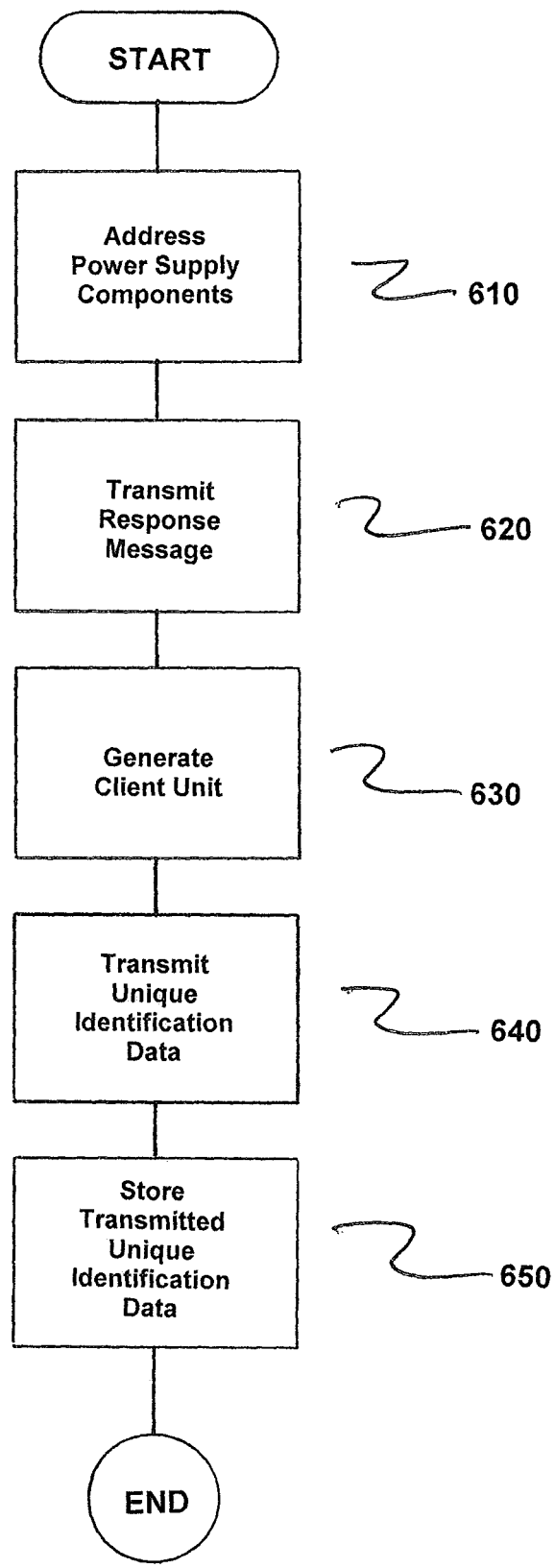
FIG. 6 is a flowchart of the method in accordance with the invention.

FIG. 6 is a flowchart of the method for startup, control and monitoring of power supply components SV1, SV2, SV3 of at least one system and by which an energy supply of control units and/or computer units of the at least one system is monitored and controlled.

The method comprises addressing power supply components SV1, SV2, SV3, which are connected to a control system via a communication network, via an identification call 101, as indicated in step 610.

Next, a response message with unique identification data ID1, ID2, ID3 of a respective power supply component SV1, SV2, SV3 is transmitted back 102 by local server units LS1, LS2, LS3 which are permanently assigned to respective power supply components SV1, SV2, SV3, as indicated in step 620.

Next, a client unit C1, C2, C3 is generating 103 for communication with the local server unit LS1, LS2, LS3 assigned to the respective power supply components SV1, SV2, SV3 for each identified power supply component SV1, SV2, SV3, as indicated in step 630.

Next, the unique identification data ID1, ID2, ID3 of the respective power supply components SV1, SV2, SV3 is transmitted 104 by a respective client unit C1, C2, C3 to a central server unit ZS, as indicated in step 640.

The transmitted unique identification data ID1, ID2, ID3 of the respective power supply components SV1, SV2, SV3 is now stored 105 in a database DB assigned to the central server unit ZS, as indicated in step 650.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for power supply components of at least one industrial manufacturing system including a programmable logic controller and by which an energy supply of at least one of (i) control units and (ii) computer units of the at least one industrial manufacturing system including the programmable logic controller is monitored and controlled, comprising:
    a central server unit including an assigned database which stores an image of at least one of (i) specific data and (ii) parameters of respective power supply components of the at least one industrial manufacturing system including the programmable logic controller, said specific data or parameters of the respective power supply components comprising device information, device type, address data, configuration parameters, or device firmware version data, and said image being accessed in an unlimited manner to configure, control, and monitor the at least one industrial manufacturing system;
    client units arranged externally to the respective power supply components of the at least one industrial manufacturing system including the programmable logic controller, said client units being for communication and for transmitting at least one of (i) the specific data and (ii) parameters from and to the respective power supply components, and a separate client unit being generated for each power supply component connected and identified based on provided templates via a communication network; and
    local server units respectively arranged within the respective power supply components for communication, said local server units being permanently assigned to the respective power supply components of the at least one industrial manufacturing system including the programmable logic controller;
    wherein in cases of an existing communication link between a respective client unit and a local server unit assigned to a respective power supply component and, after appropriate user authentication, at least one of the specific data and parameters of the respective power supply component is output on an input/output unit;
    wherein when a user role is appropriate, at least one of the specific data and parameters of the respective power supply component is changed; and
    wherein at least one of the changed specific data and parameters is forwarded via the central server unit and the respective client unit to the local server unit assigned to the respective power supply component and, after successful forwarding, is stored in the database assigned to the central server unit.

2. The control system as claimed in claim 1, wherein at least one input/output unit is additionally connectable via which at least one of (i) the specific data and (ii) parameters for the respective power supply components is at least one of (i) input, (ii) output, and (iii) change of at least one of the specific data and parameters for the respective power supply component.

3. The control system as claimed in claim 2, wherein an application is utilized to connect the at least one input/output unit and at least one of (i) the input, (ii) output, and (iii) change of at least one of the specific data and parameters for the respective power supply component is implemented via a web browser.

4. The control system as claimed in claim 3, wherein the application comprises a web application.

5. The control system as claimed in claim 2, wherein at least one of the (i) input, (ii) output, and (iii) change of at least one of the specific data and parameters for the respective power supply components is performed online or offline via the at least one input/output unit.

6. The control system as claimed in claim 3, wherein at least one of the (i) input, (ii) output, and (iii) change of at least one of the specific data and parameters for the respective power supply components is performed online or offline via the at least one input/output unit.

7. The control system as claimed in claim 1, further comprising:
    templates for generating respective client units.

8. The control system as claimed in claim 1, further comprising:
a gateway unit to which a local server unit is assignable and via which a power supply component is connectable via a point-to-point connection;
wherein a client unit for communicating with the local server unit assigned to the gateway unit can be generated.

9. The control system as claimed in claim 1, wherein at least one of (i) the central server unit, (ii) the database assigned to the central server unit, and (iii) the client units are providable via cloud computing.

10. The control system as claimed in claim 1, wherein communication between the client units and the local server units which are permanently assigned to the power supply components is implemented via an Open Platform Communications Universal Architecture (OPC-UA) interface.

11. The control system as claimed in claim 1, wherein authentication is provided for at least one of (i) accessing and (ii) interrogating at least one of the specific data and parameters of the power supply components; and wherein a range of at least one of (i) displayed data and (ii) permissible change and configuration options are definable by different user roles.

12. A method for startup, control, and monitoring of power supply components of at least one industrial manufacturing system including a programmable logic controller and by which an energy supply of at least one of (i) control units and (ii) computer units of the at least one industrial manufacturing system including the programmable logic controller is monitored and controlled, the method comprising:
addressing power supply components of the at least one industrial manufacturing system including the programmable logic controller, which are connected to a control system via a communication network, via an identification call;
transmitting back a response message with unique identification data of a respective power supply component by local server units which are permanently arranged within and assigned to respective power supply components of the at least one industrial manufacturing system including the programmable logic controller;
generating a client unit externally from the respective power supply components for communication with the local server unit arranged within and assigned to the respective power supply components for each identified power supply component of the at least one industrial manufacturing system including the programmable logic controller;
transmitting, by a respective client unit, the unique identification data of the respective power supply components of the at least one industrial manufacturing system including the programmable logic controller to a central server unit including an assigned database which stores an image of at least one of (i) specific data and (ii) parameters of respective power supply components of the at least one industrial manufacturing system including the programmable logic controller, said specific data or parameters of the respective power supply components comprising device information, device type, address data, configuration parameters, or device firmware version data, and said image being accessed in an unlimited manner to configure, control, and monitor the at least one industrial manufacturing system; and
storing the transmitted unique identification data of the respective power supply components of the at least one industrial manufacturing system including the programmable logic controller in the assigned database included in the central server unit;
wherein in cases of an existing communication link between the respective client unit and local server unit assigned to the respective power supply component and, after appropriate user authentication, at least one of the specific data and parameters of the respective power supply component is output on an input/output unit;
wherein when a user role is appropriate, at least one of the specific data and parameters of the respective power supply component is changed; and
wherein at least one of the changed specific data and parameters is forwarded via the central server unit and the respective client unit to the local server unit assigned to the respective power supply component and, after successful forwarding, is stored in the database assigned to the central server unit.

13. The method as claimed in claim 12, wherein a template is utilized to generate the client unit for an identified power supply component.

14. The method as claimed in claim 12, wherein in cases of an existing communication link between the respective client unit and the local server unit assigned to the respective power supply component, local changes of at least one of the specific data and parameters of the respective power supply component are transmitted to the respective client unit by the local server unit assigned to the respective power supply component; and
wherein after forwarding by the respective client unit at least one of the transmitted specific data and parameters of the respective power supply component is stored in the database assigned to the central server unit.

15. The method as claimed in claim 14, wherein when at least one of the specific data and parameters of a power supply component is changed locally, a notification is sent to the respective client unit by the local server unit assigned to the respective power supply component.

16. The method as claimed in claim 12, wherein in cases of an existing communication link between the respective client unit and the local server unit assigned to the respective power supply component, the power supply component is indicated as "online".

17. The method as claimed in claim 12, wherein in an event of a break in an existing communication link between the respective client unit and the local server unit assigned to the respective power supply component, an alarm is sent out.

18. The method as claimed in claim 12 wherein in an absence of an existing communication link between local server units assigned to the respective power supply components and the associated client units, changes to at least one of the specific data and parameters of the power supply components are performed via the input/output unit and stored in the database assigned to the central server unit; and
wherein a change is only transmitted to the respective local server units assigned to the respective power supply components when a communication link exists between local server units assigned to the respective power supply components and the respective client units.

19. The method as claimed in claim 10, wherein an Open Platform Communications Unified Architecture (OPC-UA) interface is utilized for data exchange for the existing communication link between the local server units assigned to the respective power supply components and the respective client units.

20. The method as claimed in claim 10, wherein a Discovery and Configuration Protocol is utilized to transmit the identification call.

* * * * *